(12) United States Patent
Choueifati (10) Patent No.: US 10,034,560 B2
(45) Date of Patent: Jul. 31, 2018

(54) STORAGE TANK FOR REFRIGERATED DISPLAY CASE

(71) Applicant: Hill Phoenix, Inc., Conyers, GA (US)

(72) Inventor: Jules G. Choueifati, Richmond, VA (US)

(73) Assignee: Hill Phoenix, Inc., Conyers, GA (US)

( * ) Notice: Subject to any disclaimer, the term of this patent is extended or adjusted under 35 U.S.C. 154(b) by 578 days.

(21) Appl. No.: 14/668,467

(22) Filed: Mar. 25, 2015

(65) Prior Publication Data

US 2016/0278543 A1    Sep. 29, 2016

(51) Int. Cl.
| | |
|---|---|
| A47F 3/04 | (2006.01) |
| B65D 25/10 | (2006.01) |
| B65D 81/38 | (2006.01) |
| B65D 25/24 | (2006.01) |
| B60B 33/00 | (2006.01) |

(52) U.S. Cl.
CPC .......... *A47F 3/0486* (2013.01); *A47F 3/0469* (2013.01); *B60B 33/00* (2013.01); *B65D 25/10* (2013.01); *B65D 25/24* (2013.01); *B65D 81/3818* (2013.01)

(58) Field of Classification Search
CPC . A47F 3/0486; A47F 23/067; B65D 81/3818; F25D 3/04; F25D 23/064; F25D 23/063; F25D 23/062; F25D 23/067
USPC .......................................................... 62/257
See application file for complete search history.

(56) References Cited

U.S. PATENT DOCUMENTS

| | | | |
|---|---|---|---|
| 2,050,063 A | * | 8/1936 | Millott ...................... A47F 3/04 62/251 |
| 3,465,536 A | | 9/1969 | Vogel et al. |
| 3,759,059 A | | 9/1973 | Kenyon |
| 4,085,986 A | | 4/1978 | Taub |
| 4,505,131 A | | 3/1985 | Boxall |
| 4,583,796 A | | 4/1986 | Nakajima et al. |
| 4,680,942 A | * | 7/1987 | Kooy ........................ A01G 5/06 62/256 |
| 5,340,208 A | | 8/1994 | Hauck et al. |
| 5,517,826 A | | 5/1996 | Duffy |
| 6,122,869 A | | 9/2000 | Richardson |

(Continued)

FOREIGN PATENT DOCUMENTS

GB         1 224 886      3/1971
WO    WO-2008/077425 A1   7/2008

*Primary Examiner* — Frantz Jules
*Assistant Examiner* — Steve Tanenbaum
(74) *Attorney, Agent, or Firm* — Foley & Lardner LLP (57) ABSTRACT

A temperature-controlled display case includes a storage tank. The storage tank includes a single-piece inner skin having an integrated locating feature formed within and configured to locate a functional component of a refrigeration system relative to the inner skin. The storage tank includes a single-piece outer skin coupled to the inner skin and having an integrated mount formed within and configured to receive a caster for mobilizing the temperature-controlled display case. The storage tank also includes a first structural frame receiving a first end of the inner skin and a first end of the outer skin, and a second structural frame receiving a second end of the inner skin and a second end of the outer skin, wherein by said receiving of the inner skin and the outer skin the first structural frame and the second structural frame are configured to couple the inner skin and the outer skin.

17 Claims, 10 Drawing Sheets

(56) References Cited

U.S. PATENT DOCUMENTS

| | | | |
|---|---|---|---|
| 6,164,739 A | 12/2000 | Schulz et al. | |
| 8,763,847 B2 | 7/2014 | Mortarotti | |
| 2002/0056283 A1* | 5/2002 | Kim | F24F 13/20 |
| | | | 62/285 |
| 2003/0230104 A1* | 12/2003 | Morse | F25D 19/00 |
| | | | 62/277 |
| 2006/0143862 A1* | 7/2006 | Dominic | B60B 33/0002 |
| | | | 16/320 |
| 2011/0162403 A1* | 7/2011 | Selin | F25D 23/063 |
| | | | 62/264 |
| 2011/0304253 A1 | 12/2011 | Howington et al. | |

* cited by examiner

STORAGE TANK FOR REFRIGERATED DISPLAY CASE

FIELD

The present disclosure relates generally to the field of temperature-controlled display devices (e.g., refrigerated display cases) having a storage tank with integrated features for housing components of the display device.

BACKGROUND

A temperature-controlled display device (e.g., a refrigerator, freezer, refrigerated merchandiser, refrigerated display case, etc.) may be used in commercial, institutional, and residential applications for storing or displaying refrigerated or frozen objects. For example, it is known to provide service type refrigerated display cases for displaying fresh food products (e.g., beef, pork, poultry, fish, etc.) in a supermarket or other commercial setting.

Such refrigerated cases typically include a storage tank for housing various components of the refrigerated display case, including various components of the cooling system. For instance, evaporator coils, air flow devices, and other cooling components may be stored within the tank. The storage tank may include an inner wall and an outer wall that are coupled together to provide a frame the tank. The inner wall and the outer wall are typically made from galvanized steel or other sheet metal, which may be cost-prohibitive. The material of the inner and outer walls may also be difficult to customize (e.g., shape, size, etc.) for the particular requirements of the storage tank. For instance, the storage tank may require various attachments or features (e.g., brackets, stops, fasteners, slots, etc.) to be coupled to the inner and outer walls to accommodate the various components stored within the tank. The inner and outer walls typically must be modified to receive these attachments or features.

The storage tank may also include a separate base frame (i.e., legs, horses, mounts, etc.) that is coupled to the outer wall and is intended to provide a platform for resting the storage tank on a surface. This platform and any other attachments or features are required to be coupled to the storage tank via various brackets, fasteners, and other coupling devices, which can increase the cost of manufacturing the tank and require additional materials. In addition, the base frame and any other attachments may be comprised of multiple components which must be pre-assembled or coupled prior to attachment to the storage tank. Therefore, it would be advantageous to provide a storage tank having fewer individual components and requiring less assembly.

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

SUMMARY

One implementation of the present disclosure is a storage tank for a temperature-controlled display case having a refrigeration system. The storage tank includes a single-piece inner skin having an integrated locating feature formed within, wherein the locating feature is configured to locate a functional component of the refrigeration system relative to the inner skin. The storage tank also includes a single-piece outer skin coupled to the inner skin and having an integrated mount formed within, wherein the mount is configured to receive a caster for mobilizing the temperature-controlled display case.

Another implementation of the present disclosure is a storage tank for a temperature-controlled display case having a refrigeration system. The storage tank includes a single-piece inner skin having an integrated locating feature formed within, wherein the locating feature is configured to locate a functional component of the refrigeration system relative to the inner skin, and a single-piece outer skin coupled to the inner skin and having an integrated mount formed within, wherein the mount is configured to receive a caster for mobilizing the temperature-controlled display case. The storage tank also includes a first structural frame receiving a first end of the inner skin and a first end of the outer skin, and a second structural frame receiving a second end of the inner skin and a second end of the outer skin, wherein by said receiving of the inner skin and the outer skin the first structural frame and the second structural frame are configured to couple the inner skin and the outer skin and to maintain an air space between the inner skin and the outer skin.

Another implementation of the present disclosure is a method for providing a storage tank for a temperature-controlled display case having a refrigeration system. The method includes providing a single-piece inner skin having an integrated locating feature formed within, wherein the locating feature is configured to locate a functional component of the refrigeration system relative to the inner skin, providing a single-piece outer skin having an integrated mount formed within, wherein the mount is configured to receive a caster for mobilizing the temperature-controlled display case, and coupling the inner skin and the outer skin to provide the storage tank, wherein an air space is provided between the inner skin and the outer skin as coupled.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a storage tank for a temperature-controlled display case is shown, according to an exemplary embodiment. The storage tank described herein may be provided in conjunction with a temperature-controlled display device (e.g., a refrigerator, freezer, refrigerated merchandiser, refrigerated display case, etc.) to house various components of the temperature-controlled display case.

The disclosed storage tank includes a single-piece inner skin having integrated features of the storage tank and/or an associated refrigeration system formed within. For instance, the inner skin may include an integrated locating feature configured to locate a functional component of the refrigeration system relative to the inner skin. The storage tank also includes a single-piece outer skin coupled to the inner skin and having integrated features formed within. For instance, the outer skin may include an integrated mount formed within. The mount may be configured to receive a caster for mobilizing the storage tank and/or an associated temperature-controlled display case. The storage tank also includes a first structural frame receiving a first end of the inner skin and a first end of the outer skin, and a second structural frame receiving a second end of the inner skin and a second end of the outer skin. The first structural frame and the second structural frame are configured to couple the inner skin and the outer skin. The structural frames may be configured to maintain an air space between the inner skin and the outer skin. An insulating material may be provided in the air space to insulate the storage tank.

Figure 1:
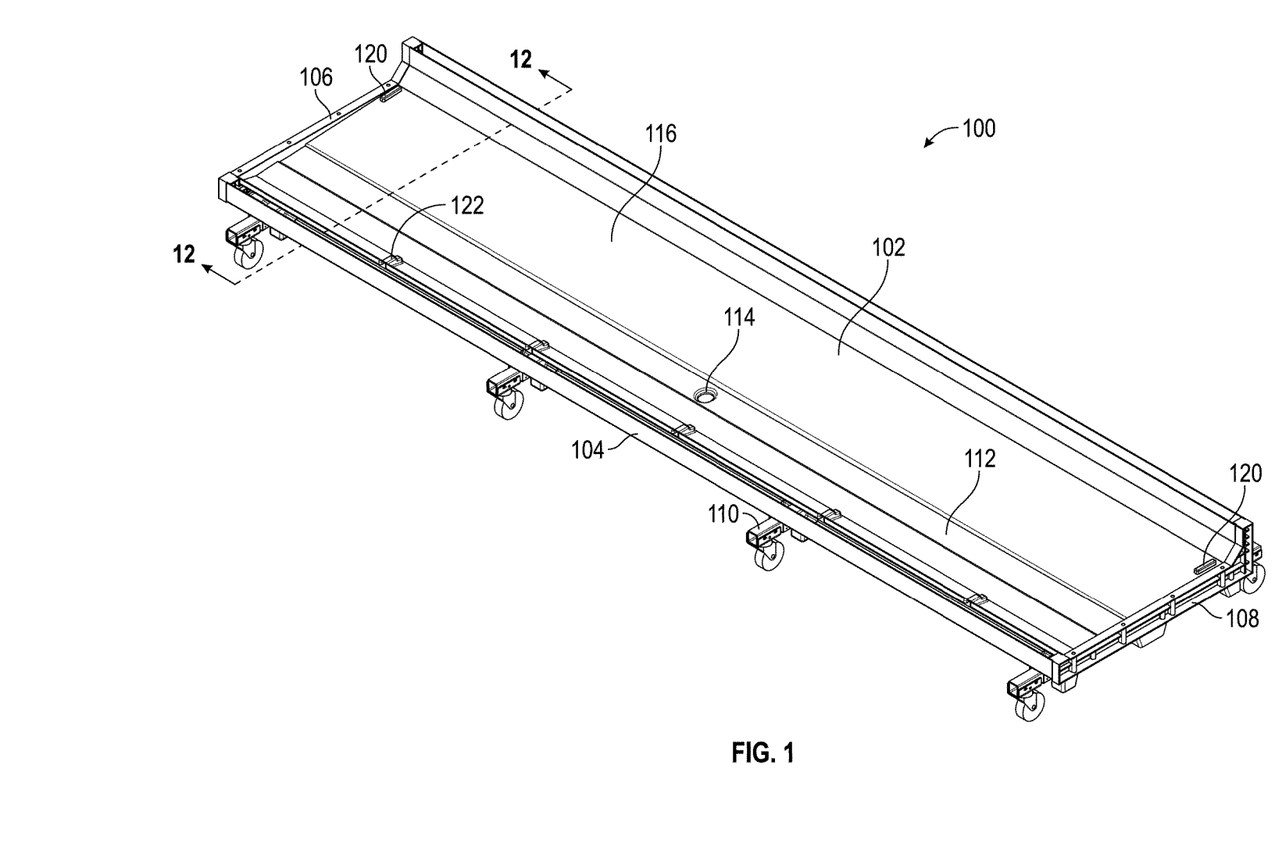
FIG. 1 is a top perspective view of a storage tank for a refrigerated display case, according to an example embodiment.
Figure 2:
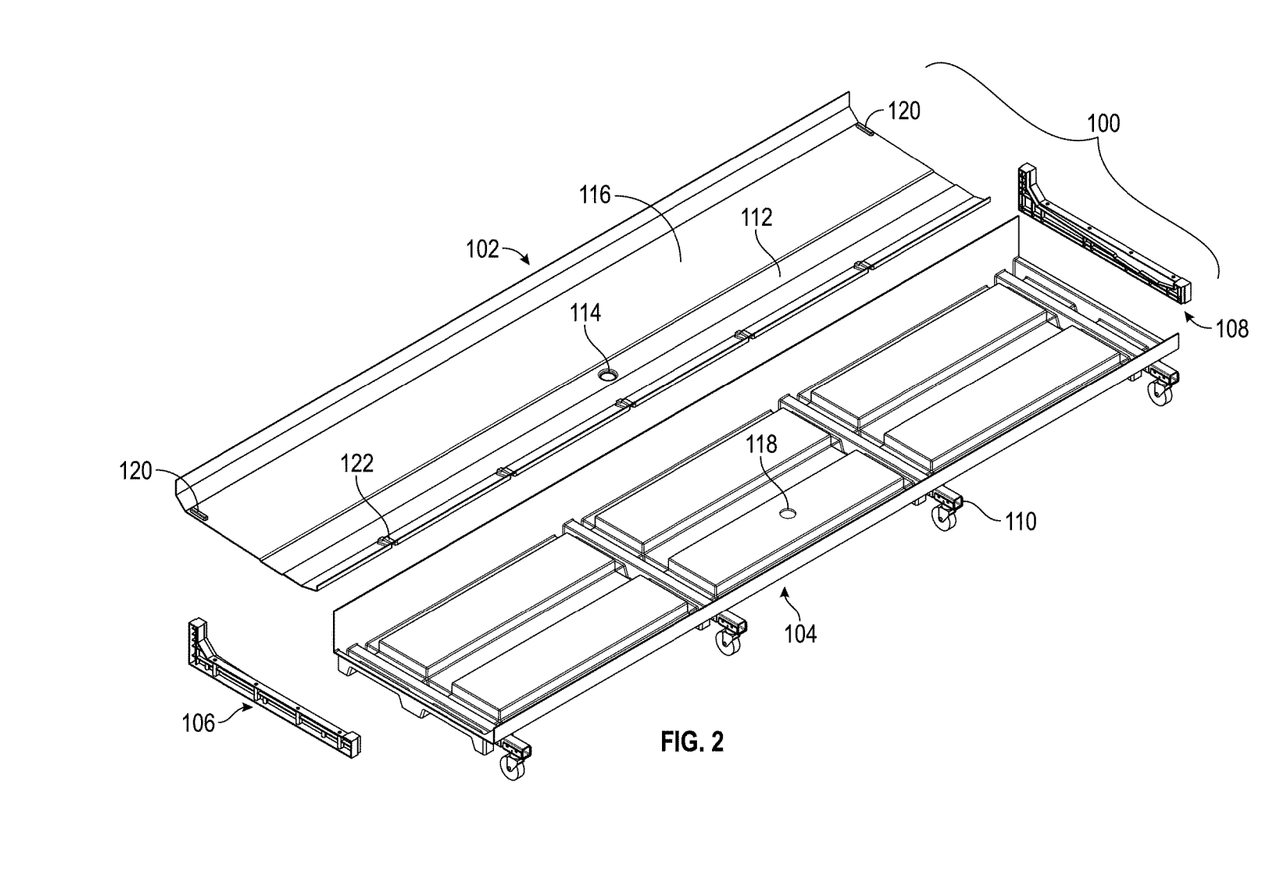
FIG. 2 is an exploded perspective view of the storage tank of FIG. 1, according to an example embodiment.
Figure 3:
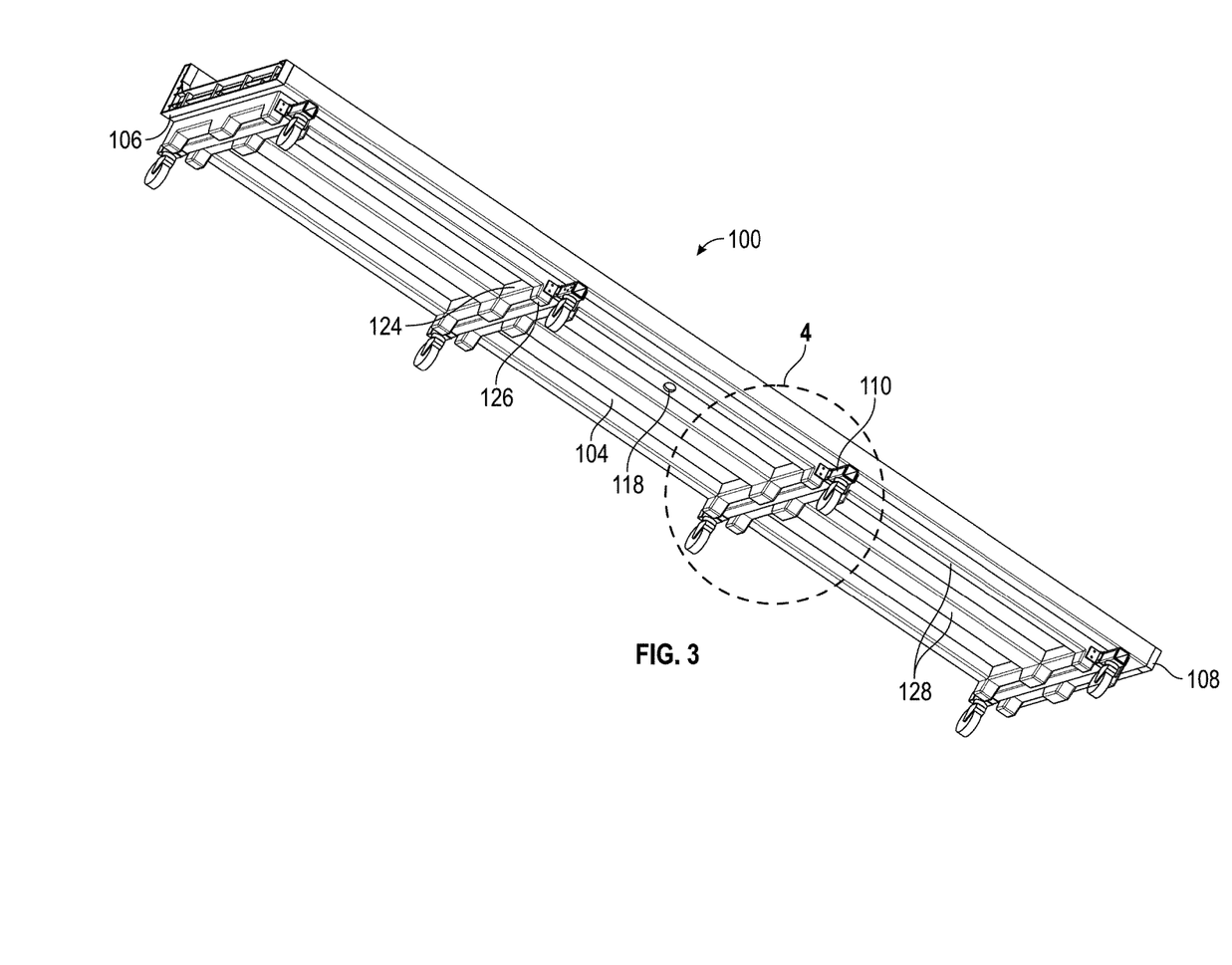
FIG. 3 is a bottom perspective view of the storage tank of FIG. 1, according to an example embodiment.

Referring now to FIGS. 1 through 3, a storage tank 100 for a temperature-controlled display device (e.g., device 10 of FIG. 13) is shown, according to an example embodiment. The storage tank 100 may be utilized to store (e.g., locate, position) one or more components of the refrigerated display case, including various components required to regulate the temperature of the display device. For instance, the storage tank 100 may be utilized to store and/or locate various evaporator coils, fans, partitioning features (i.e., air plenums), and other temperature-regulating components. The storage tank 100 may also include other features serving various functions, including a drain 114 for removing water from the storage tank 100, casters 110 for mobilizing the display device, and various locating features for positioning components that are stored within the tank 100.

Figure 12:
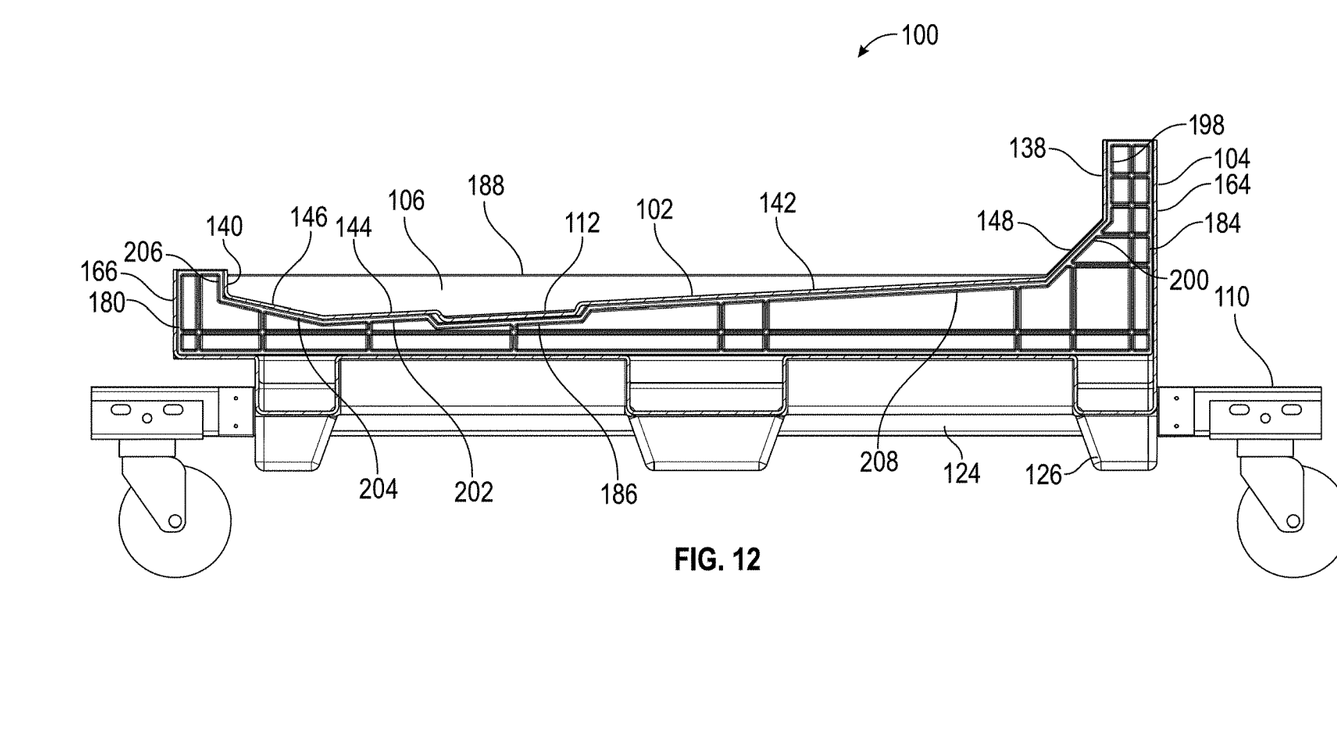
FIG. 12 is a detail cross-sectional view of the storage tank, taken along line 12-12 of FIG. 1.

The tank 100 includes an inner skin 102 and an outer skin 104. The inner skin 102 (i.e., surface, casing, membrane, shell, frame, etc.) forms an interior portion of the tank 100 and the outer skin 104 forms an exterior portion of the tank 100. The inner skin 102 and the outer skin 104 are coupled via structural frames 106 and 108. In the illustrated embodiment of FIG. 1, the inner skin 102 and the outer skin 104 are coupled such that an air space is formed between the inner skin 102 and the outer skin 104. The skins 102 and 104 are supported by features of the frames 106 and 108 such that the air space is maintained between the skins 102 and 104 (as shown in FIG. 12). The air space between the skins 102 and 104 may be filled with insulating material for insulating the tank 100. The tank 100 is also shown to include casters 110 coupled to the outer skin 104 and configured to mobilize the tank 100 and the display case components assembled therein.

The skins 102 and 104 (e.g., walls, casings, membranes, etc.) are each single-piece components having various features of the tank 100 formed or otherwise integrated within the single-piece skins 102 and 104. In an exemplary embodiment, the inner skin 102 is formed from a mold to include each of the various features of the inner skin 102 described herein (and shown by way of example in FIG. 5), and the outer skin 104 is formed from a mold to include each of the various features of the outer skin 104 described herein (and shown by way of example in FIGS. 8 and 9). For instance, the skins 102 and 104 may be formed from a plastic material or another material suitable for molding. In various embodiments, the skins 102 and 104 may be formed by thermoforming, vacuum forming, injection molding, blow molding, rotational molding, or another manufacturing process suitable for integrating features of the tank 100 within the skins 102 and 104.

In an exemplary embodiment, the inner skin 102 includes integrated locating features (e.g., locating features 120) that are formed within the inner skin 102. The locating features are configured to locate (e.g., position, secure, engage, interface with, mate with, etc.) components stored within the storage tank 100. For instance, locating features may be utilized to locate components of an associated refrigeration system, such as an evaporator (e.g., evaporator coils), air flow devices (e.g., fans), a compressor, a condenser, and the like. The locating features may be configured (e.g., sized, shaped, etc.) to interact with features of an associated component to locate the component relative to the inner skin 102.

In the illustrated embodiment of FIGS. 1 and 2, the inner skin 102 includes locating features 120. The locating features 120 are configured to engage evaporator coils that are stored within the storage tank 100 in order to locate the evaporator coils relative to the inner skin 102. Such evaporator coils may be utilized to provide chilled air to an associated refrigerated display case compartment (e.g., temperature-controlled space 12 shown in FIG. 13). The locating features 120 are positioned on inner surface 116 of the inner skin 102. The locating features 120 may be positioned on the inner skin 102 according to a desired location of the evaporator coils. In one embodiment, the locating features 120 provide a stop for the evaporator coils on each end of the tank 100. The locating features 120 may be configured (e.g., sized, shaped) according to one or more features of the evaporator coils in order to interact with the features to locate the evaporator coils relative to the storage tank 100 (e.g., relative to the inner skin 102). The inner skin 102 is shown to include locating features 120 at each end of the inner skin 102 in the illustrated embodiment, but in other embodiments the inner skin 102 may include any number of locating features 120 that are otherwise configured according to the requirements of the evaporator coils, the tank 100, and/or the associated refrigeration system. For instance, additional locating features 120 may be provided along a back edge of the inner skin 102 to limit movement of the evaporator coils in a second direction (i.e., into or away from the back edge of the inner skin 102). In other embodiments, the locating features 120 may be configured on the inner skin 102 according to the number of evaporating coils that are stored or utilized within the storage tank 100. The locating features 120 are shown more particularly in FIG. 7 and described in further detail below.

The inner skin 102 also includes support features configured to support (e.g., locate, retain, secure, etc.) one or more components that are to be stored within the storage tank 100. The support features may be similar to the locating features described above. In the illustrated embodiment of the FIGURES, the inner skin 102 includes support features shown as supports 122. The supports 122 are formed as part of the single-piece inner skin 102 and located on the inner surface 116. In an exemplary embodiment, the supports 122 are configured to support a front air return grill for an associated refrigeration system. In this embodiment, the supports 122 may be positioned on the inner skin 102 according to a desired location of the front air return grill. The supports 122 may also be configured (e.g., sized, shaped) to interact (e.g., interface, connect, etc.) with one or more features of the front air return grill in order to provide support for the grill within the tank 100. For instance, the supports 122 are formed in the inner skin 102 according to the size and shape of the front air return grill (i.e., the component to be supported). In other embodiments, the supports 122 may be configured according to one or more dimensions of an associated component.

In the illustrated embodiment of the FIGURES, the inner skin 102 is shown to include five (5) supports 122 extending along a front portion (i.e., front edge) of the inner skin 102. The supports 122 may be located according to the configuration of the FIGURES in order to support a front air return grill also extending along the front portion of the inner skin 102. In other embodiments, the inner skin 102 may include any number of support features formed throughout the inner skin 102. The support features may be configured on the inner skin 102 according to the particular function of the support features. The supports 122 are shown more particularly in FIG. 6 and described in further detail below.

The inner skin 102 also includes a drain 114 formed through the inner skin 102. The drain 114 may be utilized to drain liquid from the bottom of the tank 100. In an exemplary embodiment, the inner surface 116 includes a channel 112 (i.e., a recessed portion) extending along the length of the inner skin 102. The channel 112 is recessed from the surrounding portions of the inner surface 116. In this embodiment, the drain 114 is positioned within the channel 112. The channel 112 is angled toward the drain 114 on each side of the drain 114 such that any liquid captured by the channel 112 (e.g., from the surrounding inner surface 116) is directed toward the drain 114 to be removed from the tank 100.

Referring more particularly to FIGS. 2 and 3, the outer skin 104 includes an opening 118 that is formed through the outer skin 104. The opening 118 is located on the outer skin 104 such that the drain 114 and the opening 118 are aligned when the inner skin 102 and the outer skin 104 are coupled. In an exemplary embodiment, the drain 114 and the opening 118 share a center line. The opening 118 may be sized and shaped according to one or more dimensions of the drain 114. When the skins 102 and 104 are coupled, the opening 118 receives liquid flowing through the drain 114 and allows the liquid to exit the tank 100 through the outer skin 104.

Referring particularly to FIG. 3, the single-piece outer skin 104 also includes integrated structural supports shown as ribs 128 (e.g., rails, bars, crossbars, etc.). The ribs 128 are formed within the single-piece outer skin 104. The ribs 128 are configured to provide additional support for the structure of the outer skin 104. Each additional rib 128 or other structural support may increase the load capacity of the outer skin 104 such that additional components (or a greater total weight) may be stored in the tank 100. In the illustrated embodiment of the FIGURES, the ribs 128 extend across the length of the outer skin 104 and between mounts 124. In other embodiments, structural supports may extend across the width of the outer skin 104 or be otherwise positioned to provide additional structural support for the tank 100. The ribs 128 are raised from a surrounding bottom (outer) surface of the outer skin 104, extending downward toward a ground surface when the tank 100 rests on the casters 110. In other embodiments, the outer skin 104 may include structural supports that are raised from a top surface of the outer skin 104 (i.e., extending toward the inner skin 102) or are otherwise formed within the outer skin 104.

The single-piece outer skin 104 further includes integrated mounts 124 (e.g., trestles, stands, supports, braces, horses, etc.) formed within the outer skin 104. The mounts 124 are shown to extend across the width of the outer skin 104 such that the mounts 124 are substantially perpendicular to the ribs 128. The mounts 124 may also provide additional structural support for the outer skin 104 (and thus the tank 100). In the illustrated embodiment of the FIGURES, the outer skin 104 includes sets of mounts 124 that are configured to receive the casters 110 and couple the casters 110 to the outer skin 104 (and thus the tank 100). The interaction between the mounts 124 and the coupled caster 110 is shown in further detail in FIG. 4. The mounts 124 may also provide a contact surface for the outer skin 104 (and the tank 100) when the casters 110 are not present. For instance, the mounts 124 may rest directly on a surface (e.g., the ground) when the casters 110 are not present, raising the remainder of the outer skin 104 above the resting surface. Each mount 124 is also shown to include legs 126. The legs 126 extend from remaining portion of the mount 124 and provide contact points for the outer skin 104 when the casters 110 are not present.

Figure 4:
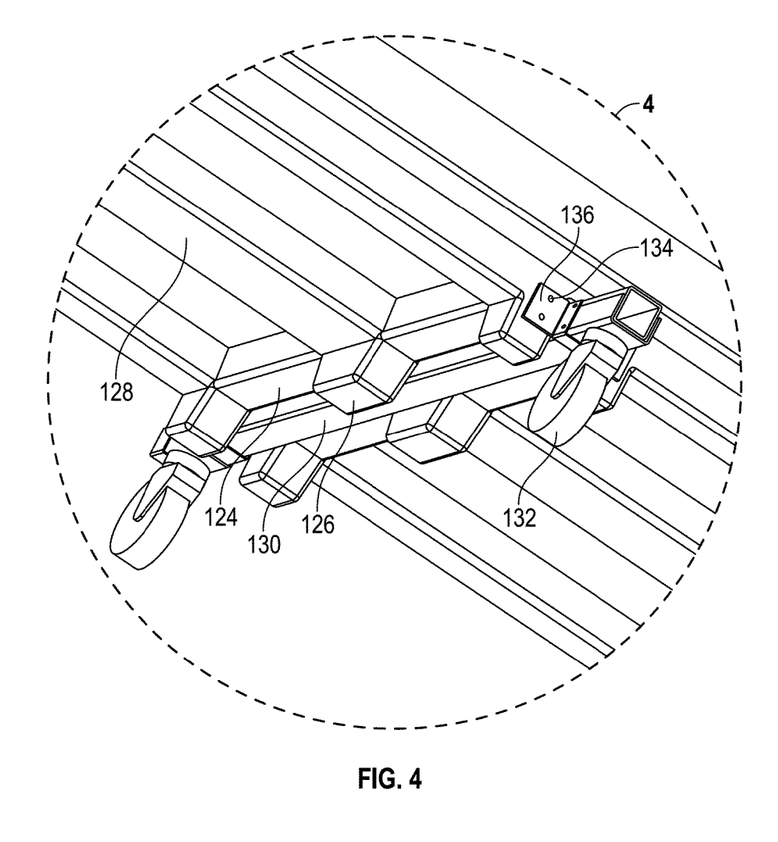
FIG. 4 is a detail view of a caster assembly of the storage tank of FIG. 3, according to an example embodiment.

Referring now to FIG. 4, the caster 110 and a set of mounts 124 are shown in further detail, according to an exemplary embodiment. Each of the casters 110 includes a rail 130 which is received by the mount 124. In an exemplary embodiment, the outer skin 104 includes a recess 168 (shown in FIG. 9) formed between each set of two mounts 124. The recess 168 is configured to match one or more dimensions of the rail 130 and receive the rail 130. The caster 110 is coupled to the mounts 124 via brackets 134 and fasteners 136. The brackets 134 interface with the rail 130 and the mounts 124 to couple the caster 110 to the outer skin 104. In an exemplary embodiment, the caster 110 is coupled to the mounts 124 by a first set of brackets 134 positioned at a first (e.g., front) end of the outer skin 104 and a second set of brackets 134 positioned at a second and opposite (e.g., back) end of the outer skin 104. Each of the mounts 124 may include slots or holes for receiving the fasteners 136 and coupling the caster 110 to the outer skin 104. The slots or holes may be formed (i.e., molded) within the mounts 124 as part of the single-piece outer skin 104.

Figures 5, 6, 7:
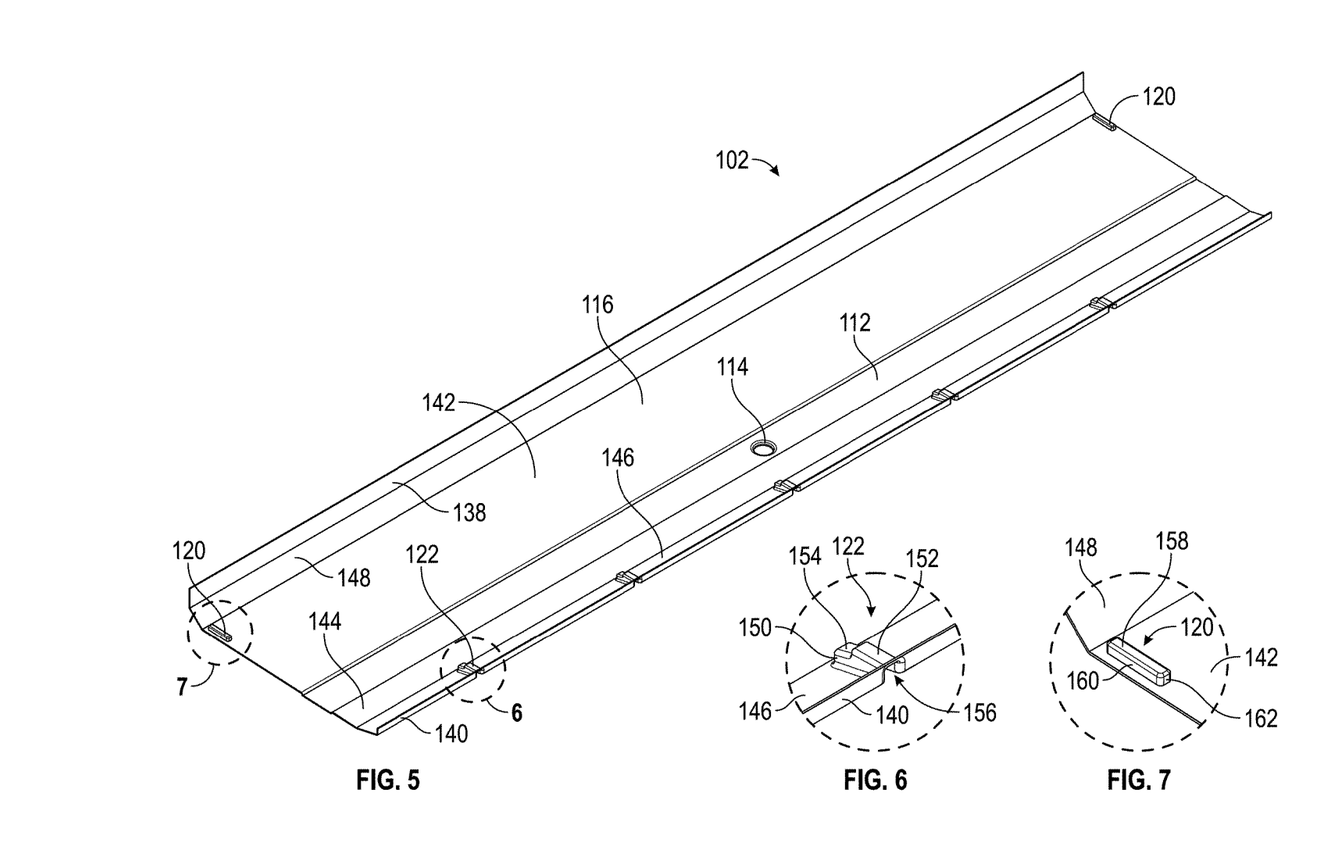
FIG. 5 is a top perspective view of an inner skin of the storage tank, according to an example embodiment.
FIG. 6 is a detail view of a support feature of the inner skin of FIG. 5, according to an example embodiment.
FIG. 7 is a detail view of a locating feature of the inner skin of FIG. 5, according to an example embodiment.

Referring now to FIGS. 5-7, the inner skin 102 is shown in further detail, according to an exemplary embodiment. In the illustrated embodiment, the inner surface 116 of the inner skin 102 is shown to include substantially flat top surfaces 142 and 144 separated by the recessed channel 112. The top surfaces 142 and 144 may also be substantially parallel to one another and/or be substantially flush (e.g., level, even, square) with one another. In one embodiment, the top surfaces 142 and 144 may be angled toward the channel 112 in order to direct any liquid in the tank 100 toward the drain 114. The top surfaces 142 and 144 may provide a substantially flat resting surface for components stored within the tank 100.

The inner surface 116 also includes a back wall formed by back surfaces 148 and 138. The back surface 148 is immediately adjacent the top surface 142 and angled relative to the top surface 142. In the illustrated embodiment, the back surface 148 forms an obtuse angle with the top surface 142. The back wall, including the surfaces 148 and 138, may provide a locating feature for a component (e.g., evaporator coils) stored within the tank 100, alone or in combination with the locating features 120. In one embodiment, for instance, the locating features 120 are configured to limit movement of one or more evaporator coils in both a first direction and a substantially opposite second direction. In this embodiment, the angled back surface 148 may limit movement of the one or more evaporator coils in a third direction that is substantially perpendicular to the first and second directions. In an exemplary embodiment, the shape of the back wall may provide a pocket (e.g., with the locating features 120) for storing the evaporator coils.

The back surface 138 is immediately adjacent the back surface 148 and forms an obtuse angle with the back surface 148. In an exemplary embodiment, the back surface 138 is substantially perpendicular to the top surface 142 and extends substantially vertically relative to a ground surface when the tank 100 is resting in an upright position (i.e., the orientation shown in FIG. 5) on the ground surface. The back surface 138 may operate in combination with the back surface 148 to locate a component within the tank 100 (i.e., relative to the inner skin 102), including to limit movement of stored evaporator coils relative to the inner skin 102.

The inner surface 116 also includes a front wall formed by front surfaces 146 and 140. The front surface 146 is similar to the back surface 148. The front surface 146 is immediately adjacent the top surface 144 and angled relative to the top surface 144. In the illustrated embodiment, the front surface 146 forms an obtuse angle with the top surface 144. The front surface 140 is similar to the back surface 138. In an exemplary embodiment, the front surface 140 is substantially parallel to the back surface 138. The front surface 140 extends substantially vertically relative to the ground surface when the tank 100 is grounded. The front surfaces 146 and 140 may also provide locating features for one or more components within the tank 100. The front surfaces 146 and 140 may, individually or in concert, limit movement of a stored component relative to the inner skin 102. The front surfaces 146 and/or 140 may also locate and/or support one or more components in concert with the supports 122. For instance, the pocket provided by the angled front surface 146 and the front surface 140 may be used to store (e.g., support, locate, etc.) a front air return grill for use in an associated refrigeration system. The front air return grill may extend across the length of the front surfaces 146 and 140 (i.e., across the length of the inner skin 102) in order to circulate air throughout the tank 100.

Referring particularly to FIG. 6, the support 122 is shown in further detail, according to an exemplary embodiment. In this embodiment, the support 122 includes vertical faces 150 extending from the front surface 146. At a first end, the vertical faces 150 converge at shelf 154. The shelf 154 is substantially perpendicular to the vertical faces 150 and substantially parallel to the front surface 146. The shelf 154 may be configured to receive a portion of the front air return grill (or another component to be supported). For instance, a dimension of the shelf 154 (e.g., height, width, area, relative angle, etc.) may be based on the configuration of the associated component (i.e., the front air return grill).

At a second end of the support 122, the vertical faces converge at top face 152. The top face 152 is raised relative to the shelf 154 and forms a pocket with the shelf 154 for receiving (e.g., locating, supporting) a component within the tank 100. The top face 152 may also receive a portion of the component in order to provide support. For instance, the supported component may rest on the top face 152 and be supported by the top face 152 and/or the front surface 140. The top face 152 is angled relative to the shelf 154, but the top face 152 and the shelf 154 are both substantially flat. Both the top face 152 and the shelf 154 may converge with the vertical faces 150 at rounded corners. The top face 152 may also converge with the front surface 140. The support 122 may also include a recess 156 formed on the underside of the inner skin 102. In one embodiment, the dimensions of the recess 156 correspond with the dimensions of the vertical faces 150, the top face 152, and the shelf 154. For instance, the volume of the recess 156 may be substantially equal to the volume of the shape formed by the vertical faces 150, the top face 152, and the shelf 154.

Referring particularly to FIG. 7, the locating feature 120 is shown in further detail, according to an exemplary embodiment. In this embodiment, the locating feature 120 is a substantially rectangular solid that is formed in the inner skin 102 and raised from the surrounding top surface 142. A space is provided between the locating feature 120 and the back surface 148 such that the locating feature 120 does not contact the back surface 148. The locating feature 120 includes two vertical faces 160 positioned substantially opposite and parallel to each other. The locating feature 120 also includes two vertical faces 162 positioned substantially opposite and parallel to each other. The vertical faces 160 and 162 extend substantially vertically from the top surface 142. The vertical faces 160 are substantially perpendicular to the vertical faces 162. Each of the vertical faces 160 converges with one of the vertical faces 162 on a first side and the other of the vertical faces 162 on a second and opposite side. The locating feature 120 also includes a top face 158 that is substantially parallel to the top surface 142 and substantially perpendicular to the vertical faces 160 and 162. The four vertical faces 160 and 162 converge at the top face 158. In an exemplary embodiment, each of the faces 158, 160, and 162 are substantially flat. However, the faces 158, 160, and 162 converge with each other to form rounded corners between each of the adjacent faces 158, 160, and 162.

In an exemplary embodiment, the locating feature 120 is configured to locate one or more evaporator coils within the tank 100. Any of the particular features or dimensions of the locating feature 120 described herein, including the features and dimensions of the faces 158, 160, and 162, may be provided (i.e., formed, integrated) in the inner skin 102 based on one or more dimensions of the evaporator coils. Any features and/or dimensions of the locating feature 120 that are similar to the evaporator coils may be utilized in order to locate (e.g., position, secure, support, lock, etc.) the evaporator coils relative to any of the inner skin 102, the outer skin 104, and the tank 100. For instance, one or more of the vertical faces 160 and 162 may be configured to interface with one or more of the evaporator coils to limit movement of the evaporator coils in one or more directions relative to the inner surface 116. In another embodiment, the rectangular three-dimensional solid shape of the locating feature 120 may be based on a similarly shaped recess or receiving feature of the evaporator coils. In this embodiment, the locating feature 120 may fit within at least a portion of the evaporator coils to locate the evaporator coils relative to the inner skin 102. In still another embodiment, the locating feature 120 and the back surface(s) 148 and/or 138 may operate in concert to locate the evaporator coils. For instance, the space between the locating feature 120 and the back surfaces 148 and 138 may be provided in order to receive and locate a portion of the evaporator coils.

Figure 8:
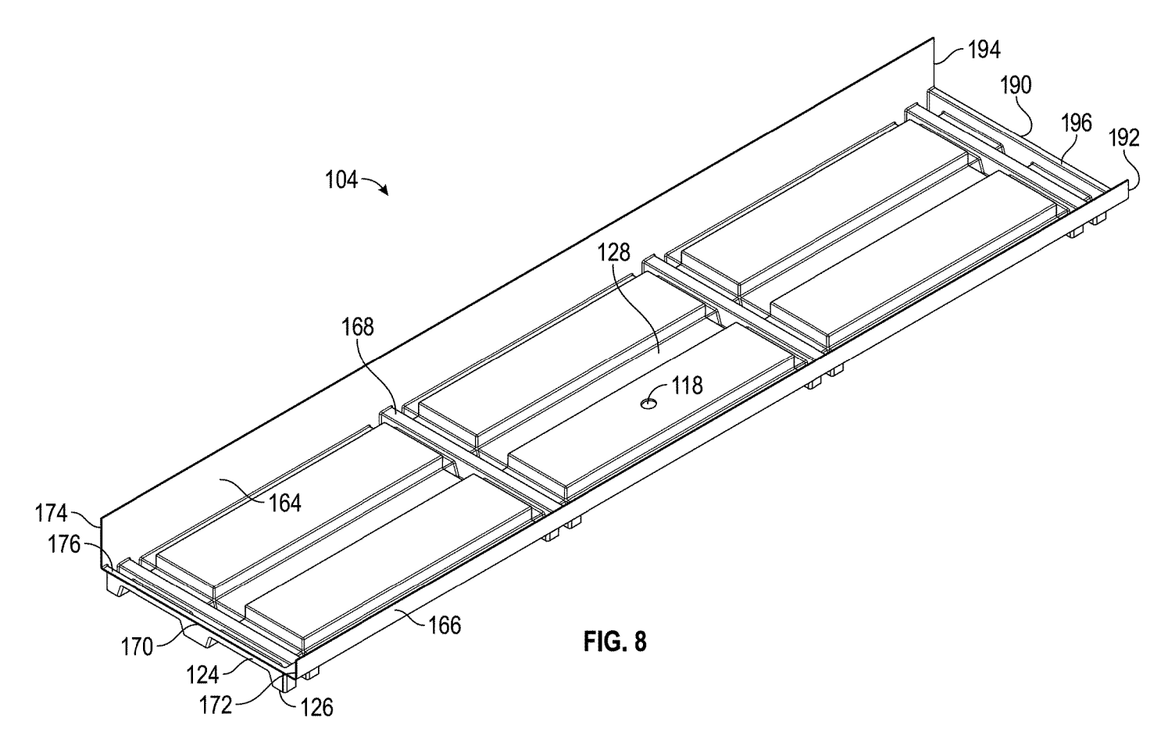
FIG. 8 is a top perspective view of an outer skin of the storage tank, according to an example embodiment.
Figure 9:
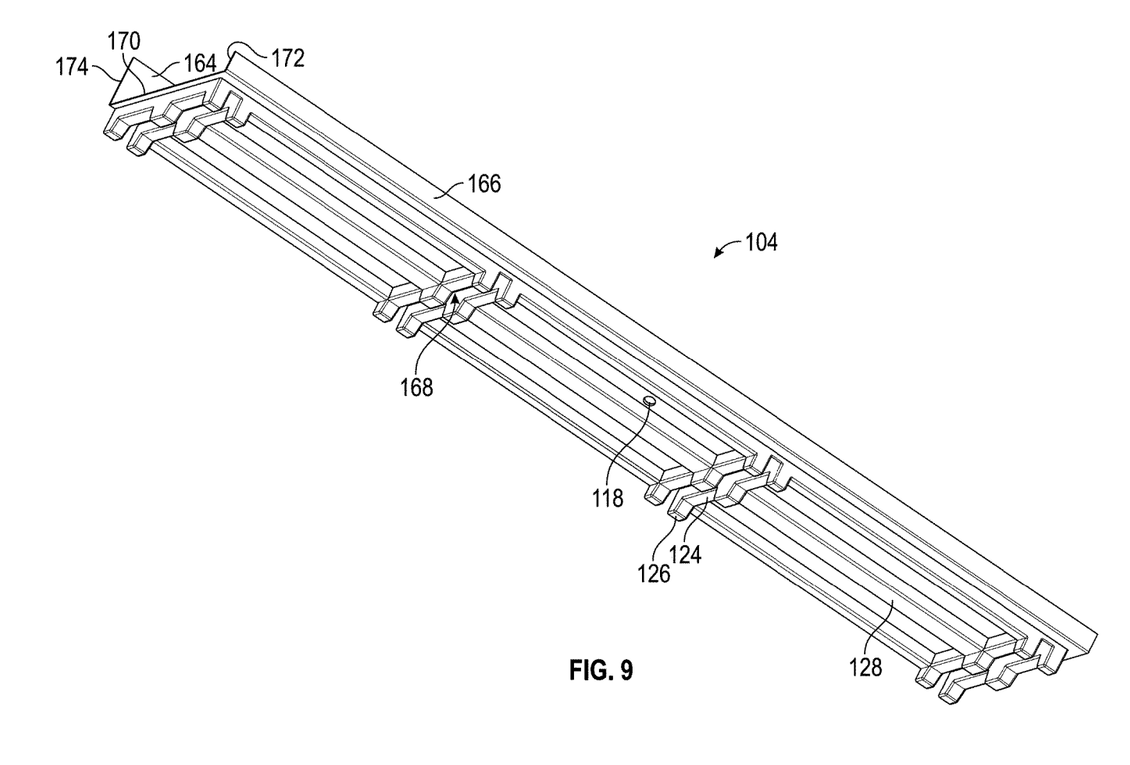
FIG. 9 is a bottom perspective view of the outer skin of FIG. 8, according to an example embodiment.

Referring now to FIGS. 8 and 9, the outer skin 104 is shown in further detail. In an exemplary embodiment, the features of the outer skin 104 shown in FIGS. 8 and 9 and described herein are integrated with the outer skin 104 and formed as a single piece. In the illustrated embodiment of FIGS. 8 and 9, the outer skin 104 is bordered by a front wall 166 and a back wall 164. The front wall 166 and the back wall 164 extend substantially vertically from the base of the outer skin 104 to form a pocket for receiving the inner skin 102. In an exemplary embodiment, the front wall 166 and the back wall 164 are substantially parallel to each other. The back wall 164 is shown in FIGS. 8 and 9 to have a height greater than the height of the front wall 166. The height of the back wall 164 may be based on a relative height of a back wall (i.e., surfaces 138 and 148) of the inner skin 102. For instance, the back wall 164 may be configured to have a height substantially equal to the back wall of the inner skin 102 when the outer skin 104 is coupled to the inner skin 102 (as shown in FIG. 1). Similarly, the height of the front wall 166 may correspond with a relative height of a front wall (i.e., surfaces 140 and 146) of the inner skin 102.

The outer skin 104 also includes various features configured to interact with the frames 106 and 108 in order to couple the outer skin 104, the frames 106 and 108, and the inner skin 102 to form the tank 100. On a first end, the outer skin 104 includes edges 170, 172, and 174 (e.g., sides, lips, rims, etc.). The edges 170, 172, and 174 are configured to mate (e.g., interface, couple, etc.) with the frame 106. For instance, in the illustrated embodiment the edges 170, 172, and 174 are connected to form a border (e.g., perimeter, boundary, pocket, etc.) that may be received by, or otherwise engage, the frame 106. In an exemplary embodiment, the edges 170, 172, and 174 are configured to substantially match one or more dimensions of the frame 106 in order to couple the outer skin 104 to the frame 106. Various mating features of the frame 106 are shown in FIGS. 10-12.

Still referring to FIGS. 8 and 9, the edge 174 is formed by the back wall 164 and the edge 172 is formed by the front wall 166. The edges 174 and 172 may share one or more dimensions with the back wall 164 and the front wall 166, respectively. The edge 170 is formed by a ledge 176 extending from the back wall 164 to the front wall 166 at or near the edges 170, 172, and 174. The ledge 176 may be a substantially flat surface configured to engage a surface of the frame 106. In the illustrated embodiment, the ledge 176 and the edge 170 are configured to be substantially parallel to a ground surface. In this embodiment, the edges 174 and 172 are substantially parallel to each other and substantially perpendicular to the edge 170.

On a second end (e.g., opposite the first end), the outer skin 104 includes edges 190, 192, and 194 and ledge 196, which are configured to mate with similarly dimensioned features of the frame 108. In an exemplary embodiment, the edges 190, 192, and 194 and ledge 196 substantially mirror the edges 170, 172, and 174 and ledge 176, respectively. Thus, any description herein related to the edges 170, 172, and 174 and the ledge 176 may apply accordingly to the edges 190, 192, and 194 and ledge 196, respectively. For instance, the edges 190, 192, and 194 and ledge 196 may be configured to substantially match one or more dimensions of the frame 108 in order to couple the outer skin 104 to the frame 108.

Figure 10:
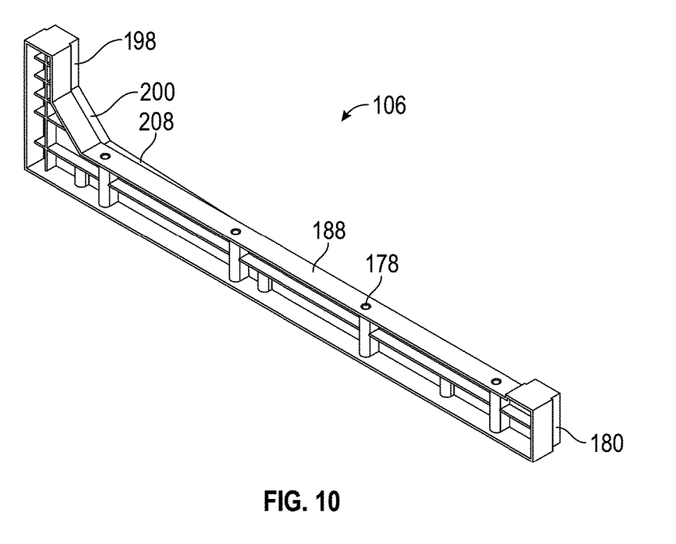
FIG. 10 is a perspective view of an outer frame of the storage tank, according to an example embodiment.
Figure 11:
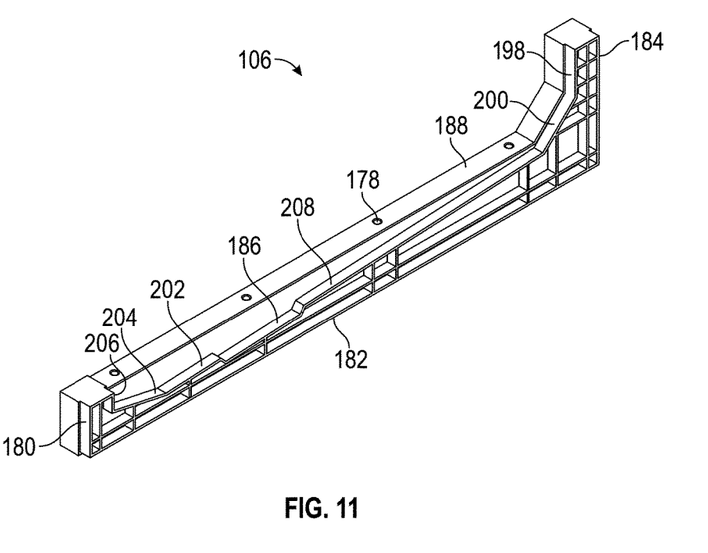
FIG. 11 is another perspective view of the outer frame of FIG. 10, according to an example embodiment.

Referring now to FIGS. 10 and 11, the frame 106 is shown in further detail. In an exemplary embodiment, the frames 106 and 108 are substantially similar and include mirrored features configured to mate with opposite ends of the inner skin 102 and the outer skin 104. Thus, any description herein related to the frame 106 may apply accordingly to the frame 108. The frame 106 includes an exposed top surface 188. The inner skin 102 and the outer skin 104 are intended to rest below the top surface 188 when coupled to the frame 106. The top surface 188 includes contours that are similar to the contours of the inner skin 102, including having an angled portion connected to a substantially vertical back portion. The frame 106 also includes holes 178 (e.g., slots, openings, etc.) formed in the top surface 188. The holes 178 may be configured to receive a fastener or another coupling component in order to couple the frame 106 (and thus the tank 100) to another component.

Referring still to FIGS. 10 and 11, the frame 106 also includes surfaces 186, 198, 200, 202, 204, 206, and 208 configured to interface with the inner skin 102. The surfaces 186, 198, 200, 202, 204, 206, and 208 form a pocket positioned below the top surface 188 and configured to receive the inner skin 102. In an exemplary embodiment, the surfaces 186, 198, 200, 202, 204, 206, and 208 substantially match the contours of the inner skin 102. As an example, the surface 198 is configured to substantially match one or more dimensions of the surface 138, such that the surface 198 interfaces with the surface 138 when the frame 106 is coupled to the inner skin 102 (as shown in FIG. 1). For instance, the surfaces 138 and 198 may have a similar relative height, length, and/or angle in order to directly interface with each other and align the inner skin 102 with the frame 106 as shown in the FIGURES. The surface pairs 200 and 148, 208 and 142, 186 and 112, 202 and 144, 204 and 146, and 206 and 140 may also have a similar relationship to the one described between surfaces 138 and 198, including having one or more similar dimensions.

The frame 106 also includes outer surfaces 180, 182, and 184 configured to interface with the outer skin 104. The surfaces 180, 182, and 184 are offset and recessed from an adjacent surface of the frame 106. In an exemplary embodiment, the distance between the recessed surfaces 180, 182, and 184 and the adjacent raised surface of the frame 106 is approximately equal to the thickness of the outer skin 104. In this embodiment, the outer skin 104 is configured to nest within the recessed portion formed by the surfaces 180, 182, and 184 such that the outer skin 104 is substantially flush with the adjacent raised surface of the outer skin 104. When the outer skin 104 is coupled to the frame 106, the surface 180 interfaces with the front wall 166 and the edge 172 of the outer skin 104, the surface 182 interfaces with the ledge 176 and the edge 170, and the surface 184 interfaces with the back wall 164 and the edge 174. In an exemplary embodiment, the outer skin 104 substantially covers the surfaces 180, 182, and 184 when coupled to the frame 106.

In an exemplary embodiment, the frame 108 is substantially similar to the frame 106. In the illustrated embodiment of the FIGURES, the frame 108 substantially mirrors the frame 106, including many of the same features as the frame 106. In this embodiment, the frame 108 is configured to couple to the outer skin 104 and the inner skin 102 in a similar manner as the frame 106 but on the end of the inner skin 102 and the outer skin 104 opposite the frame 106. Any description of the frame 106 and its relationship to the inner skin 102 and the outer skin 104 herein may apply accordingly to the frame 108.

Referring now to FIG. 12, the interaction between the inner skin 102, the outer skin 104, and the frame 106 is shown in further detail, according to an exemplary embodiment. As shown in the cross-sectional view of FIG. 12, the inner skin 102 is configured to nest within a pocket formed by the surfaces 198, 200, 208, 186, 202, 204, and 206 of the frame 106. The outer skin 104 is configured to mate with the frame 106 such that the outer skin 104 is received within a recessed portion of the frame 106 formed by the surfaces 180, 182, and 184. The frame 106 is configured to retain the inner skin 102 and the outer skin 104 such that an air space is formed between the inner skin 102 and the outer skin 104. The air space may be filled with an insulating material.

Figure 13:
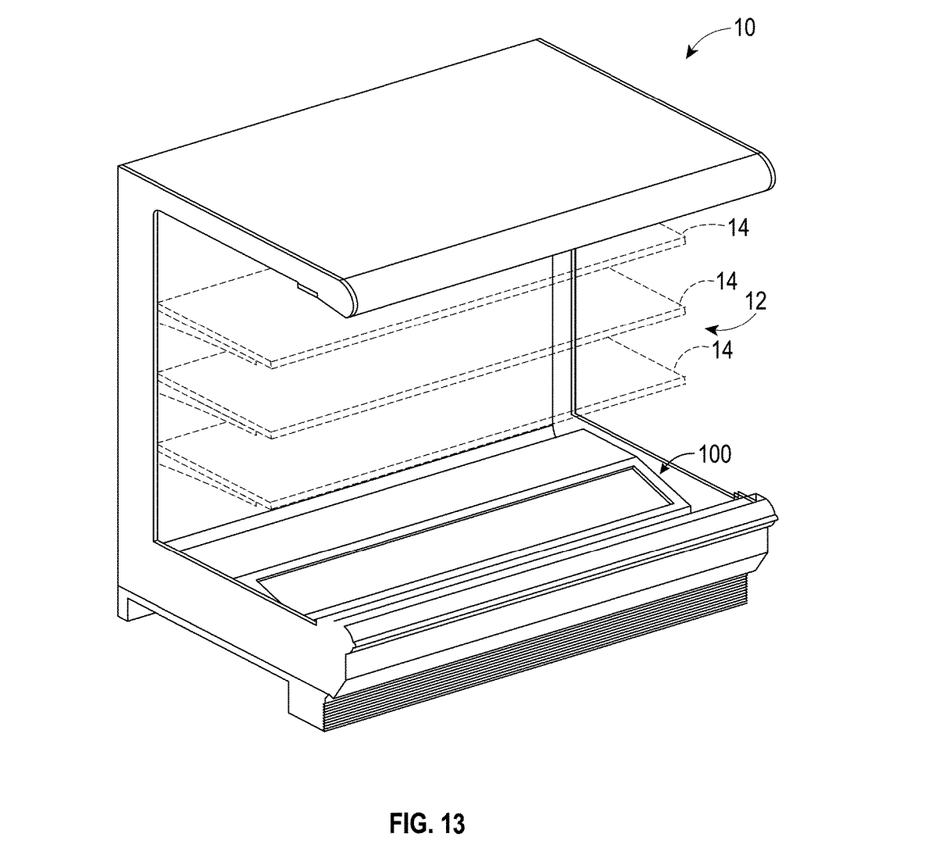
FIG. 13 is a perspective view of a temperature-controlled display device having a storage tank, according to an example embodiment.

Referring now to FIG. 13, a temperature-controlled display device 10 having a storage tank 100 is shown, according to an exemplary embodiment. The temperature controlled-display device 10 may be a refrigerator, a freezer, a refrigerated merchandiser, a refrigerated display case, or other device capable of use in a commercial, institutional, or residential setting for storing and/or displaying refrigerated or frozen objects. For example, the temperature-controlled display device 10 may be a service type refrigerated display case for displaying fresh food products (e.g., beef, pork, poultry, fish, etc.) in a supermarket or other commercial setting.

The temperature-controlled display device 10 is shown to include a temperature-controlled space 12 having a plurality of shelves 14 for storage and display of products therein. The display device 10 also includes a cooling system for cooling the temperature-controlled space 12. The cooling system may include various components that may be stored within the storage tank 100 of the display device 10. The cooling system may include a cooling element (e.g. evaporator, cooling coil, fan-coil, evaporator coil, heat exchanger, etc.), a condensing unit (e.g., heat transfer device, heat exchanger, condenser, condensing system, etc.), and various air flow components (e.g., a fan, a front air return grill, air plenums, etc.), any of which may be stored within the tank 100. In a cooling mode of operation, the cooling element may receive a liquid coolant (e.g., a secondary coolant) from the condensing unit. The liquid coolant may lower the temperature of the cooling element below the temperature of the air surrounding the cooling element, causing the cooling element (e.g., the liquid coolant within the cooling element) to absorb heat from the surrounding air. As the heat is removed from the surrounding air, the surrounding air is chilled. The chilled air may then be directed to the temperature-controlled space 12 by an air flow device in order to lower or otherwise control the temperature of the temperature-controlled space 12.

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A storage tank for a temperature-controlled display case having a refrigeration system, the storage tank comprising:
    a single-piece inner skin having an upwardly projected tab integrated with the inner skin and adapted to receive, in a sliding configuration, a functional component of the refrigeration system; and
    a single-piece outer skin coupled to the inner skin and having an integrated mount formed within and integral with the outer skin, wherein the mount is configured to receive a caster for mobilizing the temperature-controlled display case.

2. The storage tank of claim 1, wherein an air space is provided between the inner skin and the outer skin, and wherein an insulating material is provided within the air space to insulate the storage tank.

3. The storage tank of claim 2, further comprising:
    a first structural frame receiving a first end of the inner skin and a first end of the outer skin; and
    a second structural frame receiving a second end of the inner skin and a second end of the outer skin;
    wherein, by said receiving of the inner skin and the outer skin, the first structural frame and the second structural frame are configured to couple the inner skin and the outer skin and to maintain the air space between the inner skin and the outer skin.

4. The storage tank of claim 1, wherein the upwardly projected tab is configured to locate an evaporator coil of the refrigeration system, including providing a stop for the evaporator coil on at least one end of the inner skin.

5. The storage tank of claim 1, wherein the inner skin includes an integrated support feature formed within the inner skin, and wherein the support feature is configured to support an air flow device for moving chilled air as part of the refrigeration system.

6. The storage tank of claim 1, wherein the inner skin is thermoformed to include the upwardly projected tab, and wherein the outer skin is thermoformed to include the integrated mount.

7. The storage tank of claim 1, wherein the inner skin includes a channel formed within an inner surface of the inner skin and extending across the length of the inner skin, and a drain formed within the channel and through the inner skin.

8. The storage tank of claim 7, wherein the channel is recessed relative to the surrounding inner surface, and wherein the channel is configured to direct liquid within the channel to the drain by being angled toward the drain on each side of the drain.

9. The storage tank of claim 7, wherein the outer skin includes an opening formed through the outer skin and at least partially aligned with the drain such that liquid received by the drain exits the storage tank via the opening.

10. A temperature-controlled display case comprising the storage tank of claim 1.

11. A storage tank for a temperature-controlled display case having a refrigeration system, the storage tank comprising:
    a single-piece inner skin having an upwardly projected tab integrated with the inner skin and adapted to receive, in a sliding configuration, a functional component of the refrigeration system;
    a single-piece outer skin coupled to the inner skin and having an integrated mount formed within and integral with the outer skin, wherein the mount is configured to receive a caster for mobilizing the temperature-controlled display case;
    a first structural frame receiving a first end of the inner skin and a first end of the outer skin; and
    a second structural frame receiving a second end of the inner skin and a second end of the outer skin, wherein by said receiving of the inner skin and the outer skin the first structural frame and the second structural frame are configured to couple the inner skin and the outer skin and to maintain an air space between the inner skin and the outer skin.

12. The storage tank of claim 11, wherein the upwardly projected tab is configured to locate an evaporator coil of the refrigeration system, including providing a stop for the evaporator coil on at least one end of the inner skin.

13. The storage tank of claim 11, wherein the inner skin includes an integrated support feature formed within the inner skin, and wherein the support feature is configured to support an air flow device for moving chilled air as part of the refrigeration system.

14. The storage tank of claim 11, wherein the inner skin includes a channel formed within an inner surface of the inner skin and extending across the length of the inner skin, and further includes a drain formed through the inner skin and within the channel.

15. The storage tank of claim 14, wherein the channel is recessed relative to the surrounding inner surface, and wherein the channel is configured to direct liquid within the channel to the drain by being angled toward the drain on each side of the drain.

16. The storage tank of claim 14, wherein the outer skin includes an opening formed through the outer skin and at least partially aligned with the drain such that liquid received by the drain exits the storage tank via the opening.

17. A temperature-controlled display case comprising the storage tank of claim 11.

* * * * *